O. B. KIRKBRIDE.
NUT AND BOLT LOCK.
APPLICATION FILED OCT. 2, 1919.

1,335,901. Patented Apr. 6, 1920.

INVENTOR:
OLIVER B. KIRKBRIDE.
By Whiteley and Ruckman
ATTORNEYS.

UNITED STATES PATENT OFFICE.

OLIVER B. KIRKBRIDE, OF MINNEAPOLIS, MINNESOTA, ASSIGNOR OF ONE-FOURTH TO DONALD K. KIRKBRIDE, OF MINNEAPOLIS, MINNESOTA.

NUT AND BOLT LOCK.

1,335,901.  Specification of Letters Patent.  Patented Apr. 6, 1920.

Application filed October 2, 1919. Serial No. 327,936.

*To all whom it may concern:*

Be it known that I, OLIVER B. KIRKBRIDE, a citizen of the United States, residing at Minneapolis, in the county of Hennepin and State of Minnesota, have invented certain new and useful Improvements in Nut and Bolt Locks, of which the following is a specification.

My invention relates to nut and bolt locks and has for an object to provide a locking device which will prevent nuts and bolts from becoming separated from each other and lost off the parts which they secure together. In carrying out the object of my invention I provide a tap bolt for the nut-engageable end of the bolt, and sheet metal strips which inter-engage with each other and with the nut and tap bolt in such manner that the nut and the bolt proper are securely held together.

The full objects and advantages of my invention will appear in connection with the detailed description thereof and the novel features embodied in my inventive idea will be particularly pointed out in the claims.

In the accompanying drawings, which illustrate the application of my invention in one form,—

Figure 1:
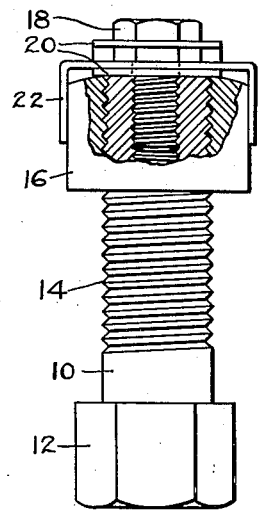
Figure 2:
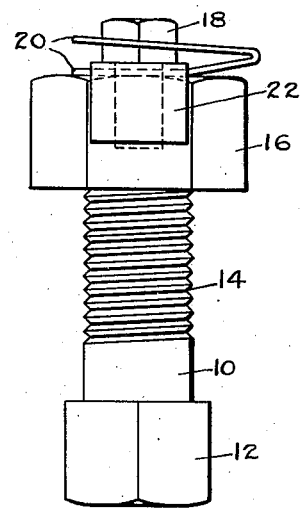
Figure 5:
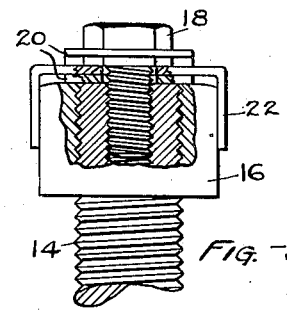
Figure 3:
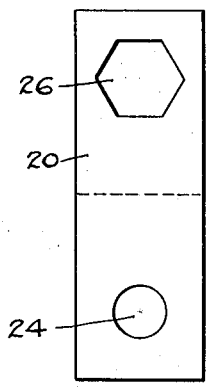
Figure 4:
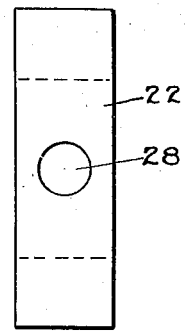

Figure 1 is an elevational view with a portion of the nut and bolt in section. Fig. 2 is a view at right angles to Fig. 1. Fig. 3 is a plan view of one of the strips which I employ. Fig. 4 is a plan view of the other of the strips. Fig. 5 is a view showing a different arrangement of threads from that shown in Fig. 1.

Referring to the particular construction shown in the drawings, 10 designates a bolt having a head 12 and provided with threads 14 upon which a nut 16 is adapted to be secured. In carrying out my invention I tap the end of the bolt longitudinally with a screw threaded hole into which a tap bolt 18 is adapted to be turned. I also provide two strips of sheet metal 20 and 22, as shown in Figs. 3 and 4. The strip 20 is provided near one end with a hole 24 of proper size to receive the shank of the tap bolt and near its other end this strip is provided with an angular hole 26 of such size and shape as to fit over the head of the tap bolt. The strip 22 is provided at its center with a hole 28 of proper size to receive the shank of the tap bolt and this strip is of sufficient length so that the ends thereof may be turned down over opposite sides of the nut 16.

In using my invention the bolt 10 is first inserted in place and the nut 16 turned down. The strip 20 is then placed so that the hole 24 registers with the hole which is tapped in the end of the bolt 10. The strip 22 is then placed cross-wise upon the strip 20 so that the hole 28 lies over the hole 24, whereupon the tap bolt 18 is screwed down into place. The ends of the strip 22 are bent down over the sides of the nut 16 and the strip 20 is bent up so that the hole 26 fits over the head of the tap bolt. Since the intermediate portion of the strip 22 lies between the two portions of the strip 20 and since the strips are made of sheet metal which is sufficiently stiff so as not to become readily bent out of their proper position while in service it is evident that the nut 16 is prevented from unscrewing by engagement of the strip 22 with the strip 20. The tap bolt 18 will ordinarily remain fixed in position unless the strip 20 is bent up to disengage it from the head of the tap bolt when it is desired to remove the latter. In the construction, as shown in Fig. 1, the nut 16 and the tap bolt 18 are unscrewed by turning movement in the same direction. If it is desirable to provide for additional security the threads 14 and the threads which are tapped in the end of the bolt 10 are inclined in opposite directions, as shown in Fig. 5, in which case any tendency of the nut 16 to unscrew will have the effect of screwing the tap bolt 18 more firmly into place.

The advantages of my invention are manifest. The locking device can be used an indefinite number of times and the nut can be readily removed upon bending up the end of the strip provided with the angular hole. Should this strip break where it is bent it may be readily replaced. It is not necessary to bend up the ends of the other strip to remove and replace the nut or to tighten the same, since all of the strips may be removed upon unscrewing the tap bolt.

I claim:

1. In a device of the character described, the combination of a bolt and a nut, a strip of sheet metal having a hole in its center and having its ends bent into engagement with opposite sides of the nut, a second strip of sheet metal one end of which has a hole and is placed underneath said first-mentioned strip with the two holes in register with each other, and a tap bolt adapted to be inserted through said holes and turned into screw-threaded engagement with a longitudinal hole in the nut-engageable end of the bolt, said second strip having its free end provided with an angular hole for fitting over the head of said tap bolt when said free end is bent down.

2. In a device of the character described, the combination of a bolt and a nut, a strip of sheet metal having a hole in its center and having its ends bent into engagement with opposite sides of the nut, a second strip of sheet metal one end of which has a hole and is placed underneath said first-mentioned strip with the two holes in register with each other, and a tap bolt adapted to be inserted through said holes and turned into screw-threaded engagement with a longitudinal hole in the nut-engageable end of the bolt, said second strip having its free end provided with an angular hole for fitting over the head of said tap bolt when said free end is bent down, and said tap hole and nut being threaded to turn on or off in opposite directions.

In testimony whereof I hereunto affix my signature.

OLIVER B. KIRKBRIDE.